United States Patent [19]

Vrisakis

[11] 4,031,024

[45] June 21, 1977

[54] PROCESS FOR IMPROVING THE STABILITY AND SHAPING OF ANHYDROUS SODIUM METASILICATE, AND THE COMPOSITIONS CONTAINING SAME, AND THE RESULTING PRODUCTS

[75] Inventor: Georges Vrisakis, Collonges-Au-Mont-d'Or, France

[73] Assignee: Societe Francaise des Silicates Speciaux "Sifrance", Coubevoie, France

[22] Filed: June 9, 1975

[21] Appl. No.: 584,755

[30] Foreign Application Priority Data

June 10, 1974 France .............................. 74.19931

[52] U.S. Cl. .............................. 252/135; 252/89 R; 252/156; 252/383; 252/384; 252/385; 252/407

[51] Int. Cl.² ..................... C11D 3/08; C11D 3/22; C11D 11/00; C11D 17/06

[58] Field of Search .......... 252/109, 110, 135, 156, 252/89, 383, 384, 385, 407

[56] References Cited

UNITED STATES PATENTS

| | | | |
|---|---|---|---|
| 2,767,146 | 10/1956 | Bonewitz | 252/156 |
| 2,804,432 | 8/1957 | Bonewitz | 252/156 |
| 2,982,739 | 5/1961 | Dvorkovitz | 252/156 |
| 3,061,552 | 10/1962 | Schenck | 252/135 |
| 3,425,948 | 2/1969 | Otrhalek | 252/550 |
| 3,583,923 | 6/1971 | Cantrell | 252/110 |
| 3,743,610 | 7/1973 | Weldes | 252/527 |
| 3,764,356 | 10/1973 | Sams | 252/135 X |
| 3,783,008 | 1/1974 | Weldes | 252/135 |
| 3,901,831 | 8/1975 | Shen | 252/527 |

*Primary Examiner*—Dennis L. Albrecht
*Attorney, Agent, or Firm*—McDougall, Hersh & Scott

[57] ABSTRACT

The invention concerns a process for improving the stability and form of substantially anhydrous sodium metasilicate, and the compositions containing same, and the resulting products. According to the invention, sodium metasilicate is treated with at least one gluconic compound. The present invention is used in particular for detergent compositions.

10 Claims, No Drawings

PROCESS FOR IMPROVING THE STABILITY AND SHAPING OF ANHYDROUS SODIUM METASILICATE, AND THE COMPOSITIONS CONTAINING SAME, AND THE RESULTING PRODUCTS

The present invention concerns a process for improving the stability and form of anhydrous sodium metasilicate, and of the compositions containing anhydrous sodium metasilicate. The invention also relates to the resulting products.

Sodium metasilicate is a product which is in current use, being extensively used in detergent compositions to which it imparts the required alkalinity, while presenting a lower degree of aggressiveness than other alkaline salts, in particular, in spite of its alkalinity, it is substantially non-corrosive in respect of glass and light metals such as aluminum.

Moreover, it has the advantage of itself having attractive detergent properties, such as an emulsifying action and an anti-redeposition action.

Accordingly, sodium metasilicate is frequently used in detergent compositions intended for washing tableware. Such detergent compositions generally comprise non-ionic surface active agents which make it possible to reduce the surface tension of the washing water containing the detergent, and thus more readily to emulsify grease.

The surface active agents which are usually employed include the products resulting from the condensation of ethylene oxide on a polypropylene glycol, or ethylene oxide on alkylphenols. Unfortunately, compositions resulting from mixing of these substances and anhydrous sodium metasilicate are not stable.

In particular, coloring is observed to appear after a certain storage period, together with the development of color from a scent change, in particular, of an aldehyde base.

It is also noted that the clouding temperature varies, depending somewhat on time. The term clouding temperature is used to denote the temperature above which the aqueous solution of the composition becomes heterogenous due to the formation of two liquid phases, this variation causing variations in the relationship between the hydrophilic-lipophilic properties of the surface active agent.

It has been found, and this is the subject of the present invention, that it was possible to remedy these disadvantages by treating a sodium metasilicate containing less than 10% by weight water with at least one gluconic compound containing gluconic acid or one of its salts.

Hereinafter, for the sake of convenience, the expression anhydrous sodium metasilicate or metasilicate will be used instead of sodium metasilicate containing by weight less than 10% water.

Such a metasilicate can be easily produced by fusing sand and sodium carbonate in a furnace at a temperature of from 1100° to 1200° C, followed by crushing, cooling and sieving.

In a preferred embodiment of the present invention, the gluconic compound used comprises gluconic acid.

In another embodiment, it comprises sodium gluconate.

Obviously sodium metasilicate can be treated with a mixture or organic compounds.

In a simple and practical mode, the metasilicate is treated with from 2 to 10 $cm^3$ of a saturated solution of at least one gluconic compound, per 100 g of metasilicate.

However, as already stated above, a particularly attractive and unexpected action results from the application of the metasilicate thus treated, to a mixture of the type of cleaning or detergent compositions containing a non-ionic surface active agent, since in this case, stabilization of the clouding temperature, inhibition of coloring and inhibition of odor forming degradation of a scent are observed.

The non-ionic surface active agent used can, in particular, comprise a fatty amine oxide, an alkylolamide, a product of condensation of ethylene oxide with a long-chain phenol or alcohol, a fatty acid, an amine or an amide.

In a simple and practical mode, it is possible to use an ethoxylated derivative, for example in particular, that resulting from the condensation of ethyl oxide on a polypropylene glycol, or ethylene oxide on an alkylphenol.

In an advantageous embodiment, this compound comprises ethoxylated nonylphenol having 9 ethylene oxide moles for 1 mole of nonylphenol.

The present invention makes it possible to produce a novel substance which is part of the invention, and which can be applied in particular to detergent compositions containing metasilicate and a non-ionic surface active agent.

Advantageously, such a composition contains by weight 20% to 60% of metasilicate, 0.2% to 2% of gluconic compound and 1% to 5% of a non-ionic surface active agent.

The present invention will be more readily understood by reference to the following examples:

EXAMPLE 1

The aim of this example is to indicate the improvement found by treating an anhydrous metasilicate with a gluconic compound in accordance with the invention.

The sodium metasilicate is prepared, as set out above, by fusing sand and sodium carbonate in a furnace at a temperature of from 1100° to 1200° C. The resulting product is then crushed, cooled and screened.

1 kg of granulated anhydrous metasilicate is then treated with 30 g of an aqueous solution containing 30% gluconic acid.

Two tests are then carried out, one being a test in respect of resistance to caking and the other being a test in respect of the formation of dust, using as a reference a specimen which comprises untreated metasilicate, on the one hand, and a specimen which has been treated as described above, on the other hand.

The test in respect of resistance to the caking comprises subjecting the product to alternate humidity and high temperature, then subjecting the resulting cake to a controlled mechanical action which destroys the cake to a greater or lesser extent, depending on the tendency of the product to cake.

The mode of operation is as follows:

20 g of the product to be tested is weighed out, and is left in a capsule for 24 hours at a relative humidty of 75% at 40° C.

the product is then left for 6 hours at a relative humidity of 20% at 40° C.

the product is then allowed to cool in ambient air.

the product is screened for one minute on a 2 mm sieve, and the amount $P_1$ which is passed and the residue $P_2$ which is not passed are weighed.

The resistance to caking is expressed by the following relationship:

$$R = (P_1/P_1 + P_2) \times 100$$

The test in respect of the formation of dust comprises measuring the amount of dust particles (particles of the order of a micron which are retained along the walls of a PVC tube when the product falls within the tube).

For this purpose, use is made of a PVC tube which is 1 m in length and which has an internal diameter of 25 mm. At its upper end the tube is provided with a vibratory charging funnel.

100 g of the product to be tested is introduced into the funnel and the rate of vibration of the funnel is controlled so as to provide a discharge flow time of 30 seconds.

The dust particles adhering to the walls of the tube are then recovered by means of 40 cm of water, and the solution is measured with N/20 $H_2SO_4$.

The following table gives the results of these two tests on a reference metasilicate and on a metasilicate which has been treated in accordance with the invention.

| Test | Resistance to caking | Formation of dust |
| --- | --- | --- |
| Reference | 5 | 30 |
| Metasilicate according to the invention | 25 | 5 |

It can be seen from the above that the resistance to caking is substantially increased whereas the formation of dust is reduced, which indicates a marked improvement in form.

EXAMPLE 2

This example is identical to that above, except that the stabilizing solution according to the invention comprises a 50% aqueous solution of sodium gluconate.

The results are given in the following table:

| Test | Resistance to caking | Formation of dust |
| --- | --- | --- |
| Reference | 5 | 30 |
| Metasilicate according to the invention | 25 | 3 |

EXAMPLE 3

The aim of this Example is to indicate the advantages of using a metasilicate which has been treated in accordance with the invention, in a non-ionic surface active agent — metasilicate mixture.

In this Example, preparation of the sodium metasilicate and its treatment are identical to those of the preceding Example.

Improvement in coloring 98 g of anhydrous metasilicate and 2 g of a surface active agent comprising ethoxylated nonylphenol having 9 moles of ethylene oxide for 1 mole of nonylphenol are mixed. This mixture is then stored in a closed container, in a drying oven at 50° C.

Coloring after 24 hours, 48 hours, 96 hours and 144 hours are observed. The following results are obtained:

| Time | 24 hours | 48 hours | 96 hours | 144 hours |
| --- | --- | --- | --- | --- |
| Reference Metasilicate | severe coloring | severe coloring | severe coloring | severe coloring |
| treated according to Examples 1 & 2 | no coloring | no coloring | no coloring | no coloring |

The reference is produced by mixing the same surface active agent with a metasilicate which has not been treated by the process of the invention, in the same proportions.

Improvement in clouding temperature

A mixture is made of 96 g of metasilicate and 4 g of the same surface active agent as above.

The mixture is stored under the same conditions as above, namely in a drying oven at a temperature of 50° C.

In order to determine the clouding temperature, 10 g of the mixture is taken off, and dissolved in 990 g of water in a beaker. The beaker is placed on a hot plate, with magnetic stirring. Stirring is at a maximum during dissolution, but is then reduced to about 150 rpm.

The beaker is covered with a clock glass with a perforation so as to permit a thermometer to be immersed in the solution contained in the beaker.

The temperature of the clouding point is taken at the time at which it is no longer possible to see the graduations of the immersed part of the thermometer.

The results obtained are given in the following table:

| Time in hours Temperature ° C | 0 | 24 hrs. | 48 hrs. | 72 hrs. | 144 hrs. |
| --- | --- | --- | --- | --- | --- |
| Reference | 32 | 29 | 26 | 24.5 | 23.5 |
| Product treated according to Examples 1 & 2 | 32.5 | 32 | 32 | 32 | 32 |

This table clearly shows the stabilizing action of the process according to the present invention.

Test in respect to stability of scent 42 g of metasilicate, 0.3 g of a scent essentially comprising citraldehyde and 2.5 g of the same surface active agent as above, are mixed in a beaker.

The mixture is stored in a closed container at a temperature of 20° C.

After 4 hours, it is found that the odor of the product according to one of Examples 1 and 2 has not varied, whereas that of the reference has been substantially changed.

EXAMPLE 4

This Example is identical to Example 2 except that the surface active agent used is a polycondensate ethylene oxide — propylene oxide on an alcohol which is commercially available under the name Plurafac RA 43, which may be represented by the formula

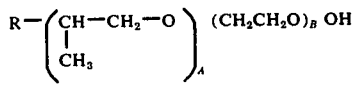

in which R is a $C_{12}$ alcohol, A is 5 and B is 6.

The coloring test is carried out on a mixture containing 96 g of metasilicate treated as described above, and 4 g of surface active agent.

The following results are obtained:

| Time | 24 hours | 96 hours | 144 hours |
|---|---|---|---|
| Reference | slight yellow coloring | medium coloring | severe coloring |
| Metasilicate according to the invention | no coloring | no coloring | no coloring |

The Examples clearly show the attraction of the present invention, which provides a marked improvement in stability and form of anhydrous sodium metasilicate, either alone or in compositions containing it.

I claim:

1. A process for improving the stability and facilitating the form of sodium metasilicate containing by weight less than 10% of water, and the compositions containing same, characterized in that said sodium metasilicate is combined with at least one gluconic compound selected from the group consisting of gluconic acid and water soluble sodium salts thereof in the ratio of 100 grams of sodium metasilicate per 2 to 10 cm³ of a saturated aqueous solution of the gluconic compound, and 1–10% by weight of a non-ionic surface active agent, to obtain a particulate product having improved resistance to caking and formation of dust.

2. A process according to claim 1, characterized in that the gluconic compound comprises gluconic acid.

3. A process according to claim 1, characterized in that the gluconic compound comprises sodium gluconate.

4. A process according to claim 1, characterized in that the sodium metasilicate is treated by spraying an aqueous solution of at least one gluconic compound over said metasilicate.

5. A process according to claim 1, characterized in that the non-ionic surface active agent comprises an ethoxylated derivative.

6. A process according to claim 5, characterized in that said composition contains from 1 to 10% of ethoxylated nonylphenol.

7. A particulate sodium metasilicate combined with a gluconic compound selected from the group consisting of gluconic acid and a sodium salt of gluconic acid in which the gluconic acid compound is present in the amount of 2 to 10 cm³ of a saturated aqueous solution per 100 grams of sodium metasilicate, and 1–10% by weight of a non-ionic surface active agent, the resulting product having improved resistance to caking and formation of dust.

8. A sodium metasilicate as claimed in claim 7 in which the gluconic compound is sodium gluconate.

9. A sodium metasilicate as claimed in claim 7 in which the gluconic compound is gluconic acid.

10. A particulate composition containing by weight from 20% to 60% of sodium metasilicate, from 0.2% to 2% of gluconic compound selected from the group consisting of gluconic acid and sodium salt thereof, and from 1% to 5% of a non-ionic surface active agent, the resulting product having improved resistance to caking and formation of dust.

* * * * *